United States Patent
Kobayashi et al.

(10) Patent No.: US 6,844,094 B2
(45) Date of Patent: Jan. 18, 2005

(54) GAS-SUPPLYING APPARATUS FOR FUEL CELL

(75) Inventors: Tomoki Kobayashi, Saitama (JP); Yoshio Nuiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 81 days.

(21) Appl. No.: 09/908,204

(22) Filed: Jul. 18, 2001

(65) Prior Publication Data

US 2002/0034669 A1 Mar. 21, 2002

(30) Foreign Application Priority Data

Jul. 18, 2000 (JP) ........................................ 2000-217011

(51) Int. Cl.[7] .......................... H01M 8/04; H01M 8/00; F04B 49/00; E03B 5/00
(52) U.S. Cl. ............................. 429/25; 429/13; 429/12; 417/43; 415/11; 137/565.13
(58) Field of Search ............................ 429/25, 13, 12, 429/38, 34, 22; 417/25, 26, 43; 415/11; 137/12, 560, 565.13

(56) References Cited

U.S. PATENT DOCUMENTS 5,441,819 A * 8/1995 Voss et al. .................... 429/13

6,497,971 B1 12/2002 Reiser .......................... 429/13

FOREIGN PATENT DOCUMENTS

| JP | 07-105963 | * | 4/1995 | ............ H01M/8/04 |
| JP | 08-124588 | * | 5/1996 | ............ H01M/8/04 |
| JP | 8-167422 | | 6/1996 | |

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A gas-supplying apparatus for a fuel cell, which generates electric power due to an electrochemical reaction between oxygen and hydrogen, during which water is produced, and which has respective gas passages within the duel cell according to the present invention comprises a gas-sucking means which supplies supply gas of the fuel cell provided on the downstream of the gas passage in a gas-flowing direction; and a pressure controller which controls the pressure of the supply gas within the fuel cell, provided on the upstream of the gas passage, whereby the water produced during the course of said electrochemical reaction is discharged. When the cell voltage is decreased, the apparatus of the present invention recovers the cell voltage by making the negative pressure large to accelerate the discharge of the produced water with minimized power consumption.

14 Claims, 5 Drawing Sheets

GAS-SUPPLYING APPARATUS FOR FUEL CELL

BACKGROUND OF THE INVENTION

1. Field of the Invention

The present invention relates to a gas-supplying apparatus for a fuel cell and a particularly to a gas-supplying apparatus for a fuel cell, which can decrease electric power consumption and which can make it easy to discharge the produced water to drive the fuel cell in an adequate manner.

2. Description of Related Arts

A fuel cell (proton exchange membrane type fuel cell) has recently drawn considerable attention as a power source of an electric powered vehicle because of its cleanness and excellent energy efficiency. Into the fuel cell, fuel gas (hydrogen) and oxidant gas (air) are supplied to electrochemically generates power.

As a gas-supplying apparatus for a fuel cell, which supplies gas to the fuel cell, an apparatus having an air compressor whose motive source is electric power generated by the fuel cell which is provided on the upstream of the fuel cell, and which compressively transfers supply air into the fuel cell has been utilized. For example, Japanese Patent Laid-Open Publication No. 8-167422 discloses a fuel cell having an air supplying system (gas-supplying apparatus for a fuel cell) in which an air compressor is provided on the upstream of the fuel cell and a pressure control valve is provided on the downstream of the fuel cell.

While the fuel cell produces water due to an electrochemical reaction, the produced water, if it stays within the fuel cell, inhibits the power generation. For this reason, in the conventional fuel cell system, supply air is compressively transferred from the air compressor in the gas-supplying apparatus for a fuel cell provided on the upstream of the fuel cell, whereby the produced air is entrained with the supply air to be discharged.

However, the gas-supplying apparatus for a fuel cell in which the supply air is compressively transferred has the disadvantage in terms of a large amount of pressure loss, which consumes wasteful electric power (parasitic power of the fuel cell) as a motive force of the air compressor. The motive power for the motor includes the electric power generated by the fuel cell. The produced water is produced in a large amount, when an airflow amount is large, in which case the electrochemical reaction is strongly brought about in the fuel cell. On the other hand, when an airflow amount becomes large, pressure loss also becomes large accordingly. For this reason, a large amount of the motive force (electric power) is required for discharging the produced water, which leads to the problem that the produced water can be discharged only with difficulty.

SUMMARY OF THE INVENTION

In light of the situations of the prior art, an object of the present invention is, therefore, to provide a gas-supplying apparatus for a fuel cell, whose electric power consumption is small, and which can easily discharge the produced water, whereby the fuel cell can be operated under adequate conditions.

An object of the present invention can be attained by a gas-supplying apparatus for a fuel cell according to the present invention.

Specifically a gas-supplying apparatus for a fuel cell, which generates electric power due to an electrochemical reaction between oxygen and hydrogen, during which water is produced, and which has respective gas passages within the fuel cell, which comprise:

a gas-sucking means which supplies supply gas of the fuel cell provided on the downstream of the gas passage relative to the flow direction of the supply gas; and a pressure controller which controls the pressure of the supply gas within the fuel cell, provided on the upstream of said gas passage, whereby the water produced during the course of said electrochemical reaction is discharged.

According to this configuration, the fuel cell is operates at a negative pressure not greater than atmospheric pressure. Consequently, the pressure loss can be decreased in comparison with the case where the supply air is compressively transferred as in the conventional apparatus. Also, the negative pressure accelerates the vaporization of the produced water. What is more, assuming that the flow amount or the supply gas is the same, the flow rate of the supply air in the case of the drawing of the supply air (negative pressure) as in the present invention is faster than that in the case of compressively transferring the supply air as in the prior art this makes it possible to accelerate the vaporization rate.

Also, according to the configuration of the present invention, the pressure control (negative pressure control) can be carried out by both of the gas-sucking means provided on the downstream of the fuel cell and the pressure controller provided on the upstream of the fuel cell. Consequently, in comparison with the negative pressure control only by the gas-sucking means, good controllability can be obtained with decreasing the motive power for heightening the negative pressure.

In a preferred embodiment of the gas-supplying apparatus for a fuel cell according to the present invention, the pressure controller controls the pressure depending upon the power generation amount generated in the fuel cell.

According to this configuration, for example, the pressure controller is controlled so that the negative pressure is greater when a target power generation amount is larger. Accordingly, in a high target power generation amount where the power generation strongly takes place and, thus, an amount of the water produced by the electrochemical reaction is increased, the negative pressure becomes large. For this reason, the produced water stays within the fuel cell only with difficulty A real power generation amount, a flow amount of and a pressure of the supply gas, and the like are parameters correlated with the target power generation amount Consequently, the term "depending upon the target power generation amount" intended herein means to encompass "depending upon parameters correlated with the target power generation amount including, but not restricted to, the real power generation amount, the flow amount of, and the pressure of the supply gas, and the like, and should not be interpreted in a narrower manner In this embodiment, the pressure controller preferably decreases the pressure of the supply gas when the power generation amount is increased.

Also, in another preferred embodiment or the gas-supplying apparatus for a fuel cell according to the present invention, the gas-sucking means controls the flow amount of the supply gas depending upon the power generation amount generated in said fuel cell. In this embodiment, the gas-sucking means preferably increases the flow amount of the supply gas when the power generation amount is increased.

In still another embodiment or the gas-supplying apparatus for a fuel cell according to the present invention, the pressure controller controls the pressure of the supply gas depending upon the cell voltage of the fuel cell. In this embodiment, the pressure controller preferably decreases the pressure of the supply gas when the cell voltage is lower than a given level. Also, in this embodiment, after the pressure of the supply gas is decreased by the pressure controller, the gas sucking means preferably controls the amount of the supply gas to be increased. It is also preferred in this embodiment that the gas sucking means increases the amount of the supply gas when the cell voltage of the fuel cell is not recovered.

One of main reason why the cell voltage is decreased is that the produced water stays within the fuel cell. However, according to this configuration where the negative pressure is controlled to be large when the cell voltage is decreased, the produced water remaining within the fuel cell is drawn out by the negative pressure, making it possible to recover the cell voltage.

Also, the present invention relates to a fuel cell system comprising the gas-supplying apparatus of the present invention.

Furthermore, the present invention relates to a process for supplying gas to a fuel cell, which generates electric power due to an electrochemical reaction between oxygen and hydrogen, during which water is produced, and which has respective gas passages within the fuel cell, comprising:

sucking the supply gas from the downstream of the fuel cell, and controlling the pressure of the supply gas to thereby discharge the water produced during the course of said electrochemical reaction.

In this embodiment, the sucking of the supply gas is preferably carried out depending upon the power generation amount of the fuel cell, and/or the pressure control of the supply gas is preferably carried out depending upon the cell voltage of the fuel cell.

BRIEF DESCRIPTION OF THE DRAWINGS

FIG. 5A shows a pattern that the cell voltage, which becomes lower than the lower limit voltage is recovered to be greater than the recovery voltage;

FIG. 5B shows a pattern that the cell voltage, which becomes lower than the lower limit voltage is recovered to be greater than the lower limit voltage and lower than the recovery voltage; and FIG. 5C shows a pattern that the cell voltage, which becomes lower than the lower limit voltage is not recovered to be the lower limit voltage.

DESCRIPTION OF THE PREFERRED EMBODIMENTS

The gas-supplying apparatus for a fuel cell according to one embodiment of the present invention will now be described in detail by referring to the drawings.

Figure 1:
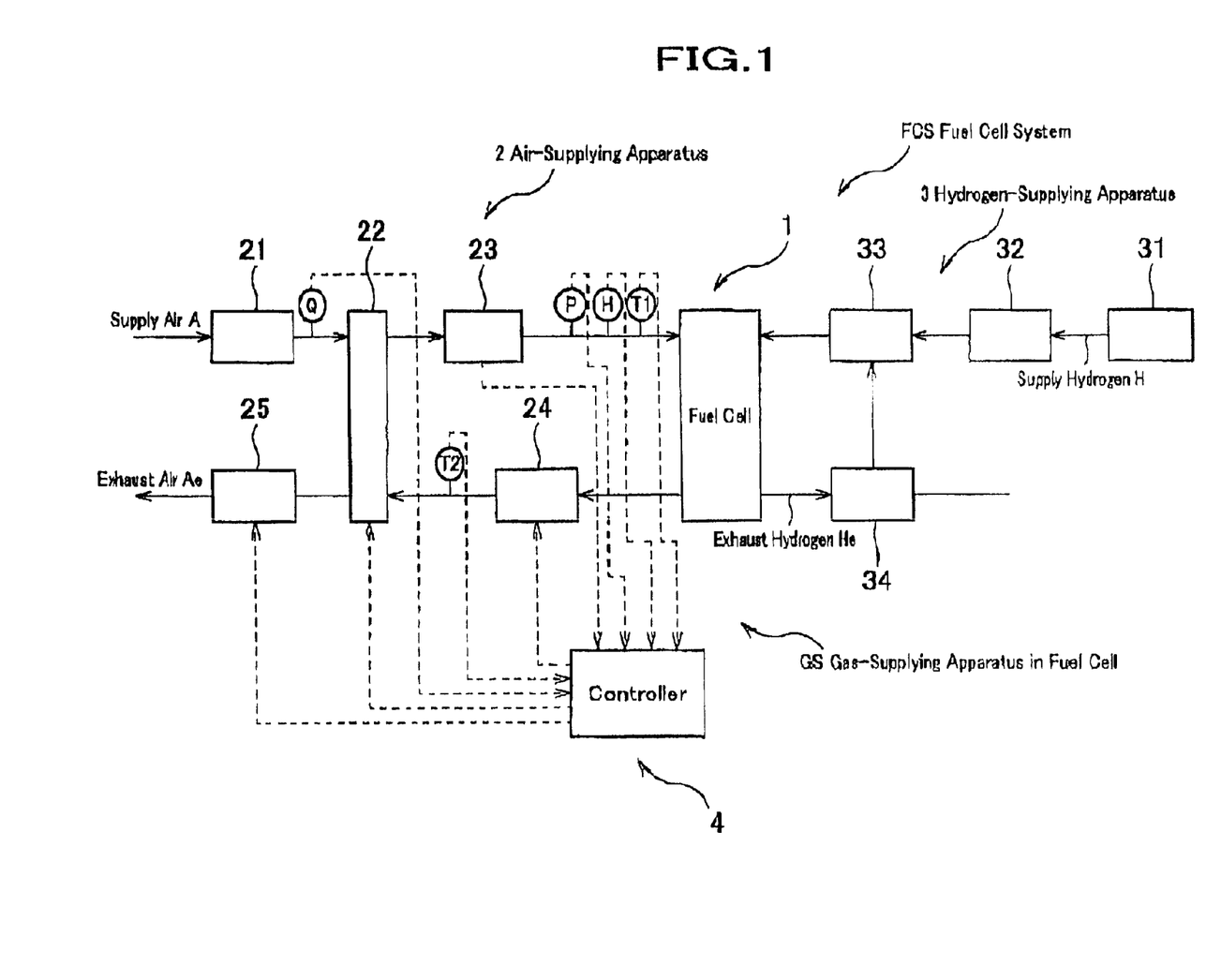
FIG. 1 is a drawing showing the whole of a fuel cell system including the gas-supplying apparatus according to one embodiment of the present invention.
Figure 2:
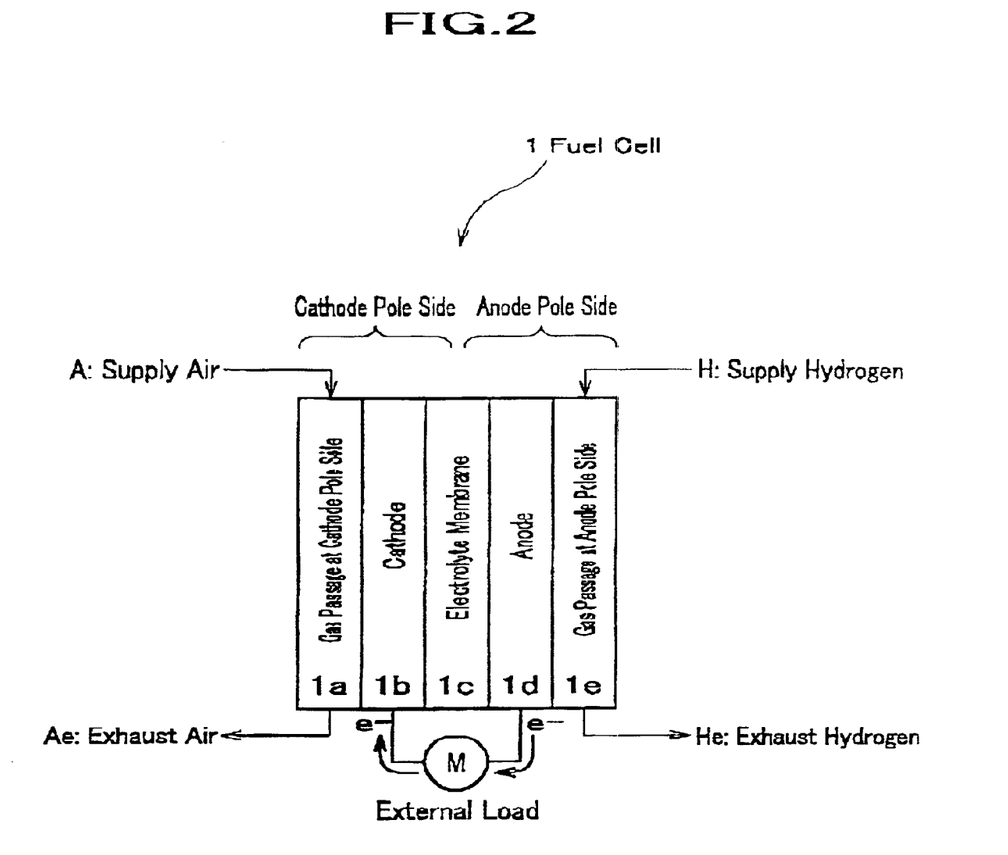
FIG. 2 is an explanatory view schematically showing the configuration of the fuel cell of FIG. 1.
Figure 3:
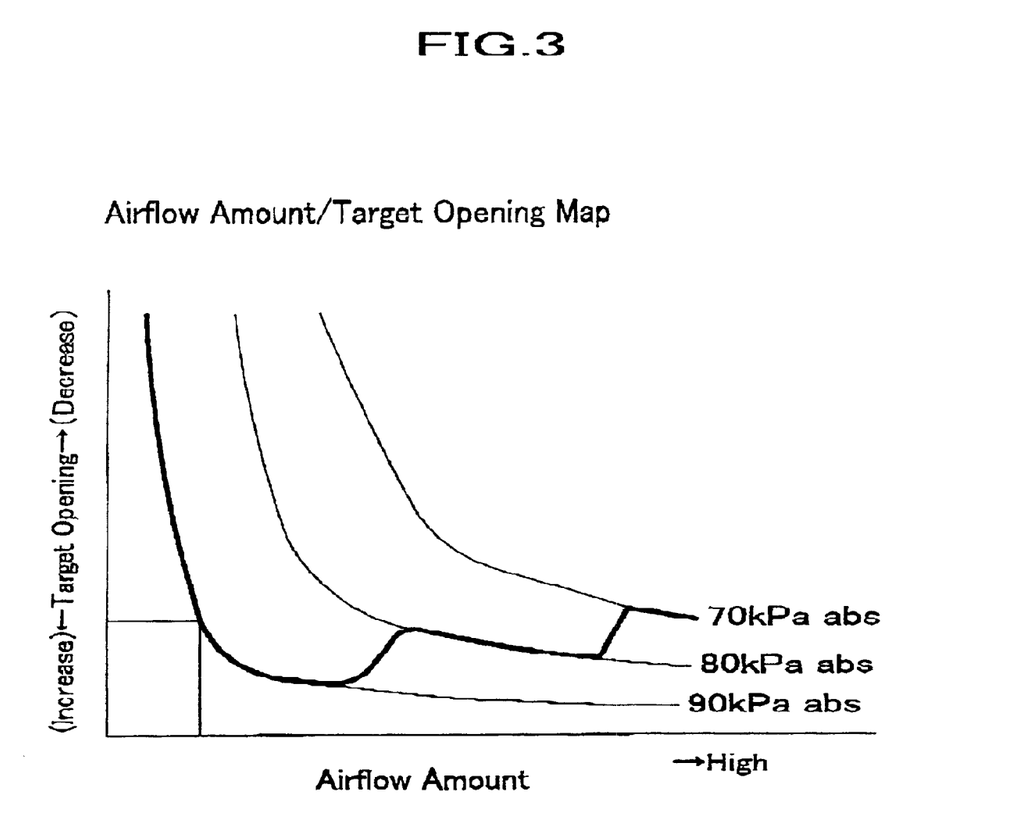
FIG. 3 is a map showing the relation between the airflow amount and the target opening utilizing one embodiment of the present invention.

FIG. 1 is a drawing showing the whole of a fuel cell system including the gas-supplying apparatus according to one embodiment of the present invention. FIG. 2 is an explanatory view schematically showing the configuration of the fuel cell of FIG. 1. FIG. 3 is a map showing the relation between the airflow amount and the target opening utilizing one embodiment of the present invention.

A fuel cell system FCS shown in FIG. 1 is an electric power generation system based on a fuel cell 1. The fuel cell system FCS is mainly composed of the fuel cell 1, an air-supplying apparatus Z, a control unit 4, and the like. The fuel cell system FCS in this figure is intended to be carried on a fuel cell type electric powered vehicle.

As shown in FIG. 2, the fuel cell 1 is divided into a cathode side (an oxygen pole side) and an anode side (a hydrogen pole side) across an electrolyte membrane $1c$. Electrodes containing a platinum series catalyst are provided on both sides to form a cathode electrode $1b$ and an anode electrode $1d$, respectively. As the electrolyte membrane $1c$, a solid macromolecular membrane such as a perfluorocarbon sulfonic acid membrane, which is a proton-exchange membrane, is used. The electrolyte membrane $1c$ has a plurality of proton exchanging groups in the molecule thereof, and a low specific resistance at the normal temperature when it has a saturated moisture content, acting as a proton-conductive electrolyte. The catalyst contained in the cathode $1b$ is a catalyst in order to produce oxygen ions from oxygen, and the catalyst contained in the anode $1d$ is a catalyst in order to produce protons from hydrogen.

A cathode side gas passage $1a$ which allows a supply gas A as an oxidant gas for passing therethrough is provided outside the cathode electrode $1b$, while an anode side gas passage $1e$ which allows hydrogen H to be supplied as a fuel gas for passing therethrough is provided outside the anode electrode $1d$. An inlet and outlet of the cathode side gas passage $1a$ are connected to the air-supplying apparatus 2, and an inlet and outlet or the anode side gas passage $1d$ are connected to the hydrogen-supplying apparatus 3. The configuration of the fuel cell 1 shown in FIG. 2 is schematically shown as a single cell, but an actual fuel cell 1 is made up of a laminate with approximately 200 single cells laminated. Since the fuel cell heals up due to electrochemical reaction during the course of the power generation, the fuel cell 1 has a cooler (not shown) which cools the fuel cell 1.

In the fuel cell 1, when the supply air A in supplied to the cathode side gas passage $1a$ and the supply hydrogen H is supplied to the anode side gas passage $1e$, hydrogen is ionized due to the cataliyzation at the anode electrode $1d$ to produce protons, which then move within the electrolyte membrane $1c$ to reach the cathode electrode $1b$. The protons reacting the cathode electrode $1b$ are readily reacted with the oxygen ions produced from the oxygen contained in the supply air A to produce water. The supply air A containing the water thus produced (produced water) is discharged from the outlet at the cathode side of the fuel cell 1 as exhaust air Ae, which contains a large amount of moisture). Electron e are produced at the anode electrode $1d$ at the time of ionizing hydrogen, the resulting electrons e-reach the cathode electrode $1b$ via an external load M such as a motor.

As shown in FIG. 1, the air-supplying apparatus 2 making up the gas-supplying apparatus GS in the fuel cell is composed mainly of an air cleaner 21, a humidifier 22, a valve 23 for controlling the negative pressure, a suction pump 24, a valve 25 for controlling a discharge pressure, an airometer (flow sensor) Q, thermo-sensors $T_1$ and $T_2$, a humidity sensor H, a pressure sensor P, and the like.

The air cleaner 21 is composed of a filer (not shown), and the like, and filtrates the air supplied to cathode electrode side of the fuel cell 1 (supply air A) the to thereby remove dusts contained in the supply air A.

The humidifier 22 used herein is a water-permeable type humidifier utilizing hollow fiber membrane (not shown) is used as the humidifier 23. The hollow fiber membrane comprises hollow fibers each having a hollow passage, a diameter ranging from 1 to 2 mm and a length of several ten cm. The humidifier 22 is composed of two hollow fiber membrane modules each accommodated within a hollow container, each module comprising a bundle of several thousands of hollow fibers, piping which connects these two hollow fiber membrane modules in parallel, switchers for switching these two hollow fiber membrane modules depending upon the flow amount and the humidity of the supply air, such as an electromagnetic valve and a controller for the electromagnetic valve (all being not shown). In this embodiment, the controller for the electromagnetic valve is included in the control unit 4.

The humidifier 22 utilizing the hollow fiber membrane serves as a heat exchanger which exchange the heat possessed by the exhaust air Ae to the supply air A. The fuel cell 1 is operated at a temperature from about 80 to 90° C. For this reason, the temperature-controlled supply air A controlled to be from 60 to 75° C. is introduced into the fuel cell 1. Whereas no special heat exchanger is used in this embodiment, a heat exchanger may be separately used.

The valve 23 for controlling the negative pressure is composed mainly of a butterfly valve and a stepping motor for driving the valve (not shown), and controls a pressure negative pressure) within the fuel cell 1 by decreasing or increasing the opening of the valve 23 for controlling the negative pressure. It is noted that when the opening of the valve 23 is decreased, the negative pressure of the fuel cell 1 becomes large (the absolute pressure becomes small), while when it is increased, the negative pressure of the fuel cell 1 becomes small (the absolute pressure becomes large to come close to the atmospheric pressure. The negative pressure control of the fuel cell 1 will be described later on.

The suction pump 24 (gas-sucking means) is composed mainly of a super charger and a motor for driving the super charger (not shown), which draws the supply air A having been used as the oxidant gas in the fuel cell 1, i.e., the exhaust gas Ae and compresses and transfers it to the later humidifier 22. The suction pump 24 plays a role in operating the fuel cell 1 at a negative pressure (pressure lower than the atmospheric pressure). The suction pump 24 also plays a role in making the exhaust gas to be a heat source (heating medium) for heating the supply air A with the exhaust air Ae whose temperature is increased by adiabatically compressing the exhaust gas. If the opening of the valve 23 is constant, the suction pump can make the negative pressure large by increasing the revolution number of the motor. On the other hand, the negative pressure can be controlled to be small if the revolution number of the motor is decreased. The motive power for the motor is the electric power generated by the fuel cell 1 or electric power stored in a battery (not shown).

The valve 25 for controlling a discharge pressure is composed mainly of a butterfly valve and a stepping motor for driving the valve (not shown), and controls the pressure of the exhaust air discharged from the suction pump (discharge pressure) by decreasing or increasing the opening of the valve 25. If the opening of the valve 25 for controlling a discharge pressure is decreased, the discharge pressure from the suction pump 24 is increased and, accordingly, the range of increasing the temperature of the exhaust gas Ae is increased. Conversely, if it is increased, the discharge pressure from the suction pump 24 is decreased and, accordingly, the range of increasing the temperature of the exhaust gas Ae is decreased.

The airometer Q is composed of a differential pressure type flow meter etc., and it detects the flow amount of the supply air A after flowing through the air cleaner 21 and sends the detected signal to the control unit 4.

The thermo-sensor $T_1$ is composed of a thermister etc., and it detects the temperature of the supply gas A at the inlet of the fuel cell 1 at the cathode side, which is sent to the control unit 4.

The thermo-sensor $T_2$ is composed of a thermister etc., similar to the thermo-sensor $T_1$, and it detects the temperature of the exhaust air Ae at the outlet of the compressor 24, which is sent to the control unit 4.

The humidity sensor H is composed of a macromolecular type humidification sensor, etc., and it detects the humidity of the supply gas A at the inlet of the fuel cell 1 at the cathode side, which is sent to the control unit 4.

The pressure sensor P is composed mainly of a Bourdon-tube, bellows, a diaphragm, and a strain gauge, and detects the pressure of the supply air A at the inlet of the cathode pole side of the fuel cell 1, which is sent to the control unit 4.

As shown in FIG. 1, the hydrogen-supplying apparatus 3 is composed of a hydrogen gas cylinder 31, a regulator 32, a hydrogen-circulating pump 33, a three-way valve 34, and the like.

The hydrogen gas cylinder 31 is composed of a high-pressure hydrogen bottle (not shown) and it stores the supply hydrogen gas H to be introduced into the anode pole side of the fuel cell 1. The supply hydrogen E to be stored is pure hydrogen having a pressure of from 15 to 20 MpaG (150–200 kg/cm$^2$G). It is noted that the hydrogen gas cylinder 31 may be a type having a built-in hydrogen-occlusion alloy which stores hydrogen at a pressure of approximately 1 MpaG (10 kg/cm$^2$G)

The regulator 32 is composed of a diaphragm, a pressure-adjusting spring (not shown), etc. and is a pressure controller which decreases the pressure of the supply hydrogen stored at a high pressure to a prescribed level so that the supply hydrogen H may be utilized at a constant pressure. Taking the atmospheric pressure as the reference pressure to be introduced into the diaphragm, the regulator 32 can decrease the pressure of the supply hydrogen H stored in the hydrogen gas cylinder 31 to a level near the atmospheric pressure. Taking the pressure of the negative pressure portion of the air-supplying apparatus 2 which is operated at a negative pressure as a reference pressure to be introduced into the diaphragm, the pressure of the supply hydrogen H stored in the hydrogen gas cylinder 31 can be decreased to a pressure near the pressure of the corresponding negative pressure portion. In the first embodiment, since the hydrogen-supplying apparatus 3 is operated at a negative pressure not higher than the atmospheric pressure, the pressure at the intake side of the compressor 24 of the air-supplying apparatus 2 is input as the reference pressure. By operating the hydrogen-supplying apparatus 3 at a negative pressure, the external leakage of the flowing hydrogen can be prevented, which improve the fuel efficiency.

The hydrogen-circulating pump 33 is composed of an ejector (not shown), etc., and it utilize a flow of the supply hydrogen H towards the anode side of the fuel cell 1 to suck the supply hydrogen H having been used in the fuel cell 1, i.e., the exhaust hydrogen He, which is discharged from the anode side of the fuel cell 1 and flows through a three-way valve 34, and to circulate it. The reason why the exhaust hydrogen is circulated and used is that the supply hydrogen H is pure hydrogen stored in the hydrogen gas cylinder 31.

The three-way valve 34 is composed of a passage switcher (not shown), etc., and it switches the passage of the exhaust hydrogen He to the discharge position or circulation position. When the three-way valve 34 is switched to the discharge position, the exhaust hydrogen He is discharged out of the system of the hydrogen-supplying apparatus 3. When the three-way valve 34 is switched to the circulation position, the exhaust hydrogen He is introduced into a hydrogen circulation pump 33.

The control unit 4 of the gas-supplying apparatus GS in the fuel cell is composed mainly of CPU, a memory, an I/O interface, an A/D converter, and a bus (not shown) and totally controls the fuel cell system FCS as well as controls the flow amount of, the temperature of, and the humidity of the supply air A and the negative pressure of the fuel cell 1. As described above, the control unit 4 receives the detected signals from respective sensors Q, $T_1$, $T_2$, H, and P. Also, the control unit sends control signals to the humidifier 23, the valve 23 for controlling the negative pressure, the suction pump 24, and valve 25 for controlling a discharge pressure. Outline of controlling the flow amount of, the temperature of, and the humidity of the supply air A and the negative pressure of the fuel cell 1 will now be described.

(1) Control of Flow Amount:

The control unit 4 decides a target power generation amount through a map based on an output demand signal from means for adjusting output such as an accelerator pedal. From the target power generation amount, the control unit 4 also decides a target flow amount of the supply air A which is required. When the target flow amount is increased, the control unit 4 produces a control signal so as to increase the revolution number of the motor of the suction pump 24, and send it to the suction pump 24. On the other hand, when the target flow amount is decreased, the control unit 4 produces a control signal so as to decrease the revolution number of the motor of the suction pump 24, and send it to the suction pump 24. In this case, feedback control is performed no that the deviation between the detected signal from the flow amount sensor Q and the target flow amount becomes zero.

(2) Temperature Control:

The control unit 4 controls the temperature of the supply air A to be the target temperature ranging from 60° C. (the lower limit of the prescribed temperature) to 75° C. (the upper limit of the prescribed temperature) on the basis of the detected signal from the thermo-sensor $T_1$ by means of the opening of the valve 25 for controlling the discharge pressure through the stepping motor. Specifically, when the temperature of the supply air A is or will be increased to be not lower than the target temperature, the control unit 4 produces a control signal so as to drive the stepping motor in such a manner as to decrease the opening of the valve 25, and send the produced signal to the valve 25. This decreases the discharge amount from the suction pump 24, decreasing the temperature of the exhaust gas Ae, which in turn, decreases the heat exchange amount in the heat exchanger 22 to thereby decrease the temperature of the supply air A. On the other hand, when the temperature of the supply air A is or will be decreased to be not higher than the target temperature, the control unit 4 produces a control signal so as to drive the stepping motor in such a manner as to increase the opening of the valve 25 for controlling the discharge pressure, and send the produced signal. This increases the discharge amount from the suction pump 24, increasing the temperature of the exhaust gas Ae, which in turn, increases the heat exchange amount in the humidifier 22 to thereby increase the temperature of the supply air A. At this time, a feedback control is performed so that the deviation between the detected signal from the thermometer $T_1$ and the target temperature becomes zero. Irrelevant to the opening of the valve 25, the suction pump 24 actuates to supply the supply air A in a target flow amount into the fuel cell 1.

As a fail-safe mechanism, when the detected signal from the thermo-sensor $T_2$ becomes higher than a given level (not lower than 150° C.), in order to protect the suction pump 24, etc., the control unit 4 produces a control signal for increasing the opening of the valve 25 and/or a control signal for decreasing the discharge amount from the suction pump 24 and send it/them. This decreases the temperature at the discharge side of the suction pump 24 to thereby protect the suction pump 24.

(3) Humidity Control:

The control unit 4 controls the humidity of the supply air A to be supplied into the inlet of the fuel cell 1 at the cathode pole side so as to be a target humidity on the basis of the detected signal from the humidity sensor H by switching two hollow fiber membrane modules to be used. Specifically, when only one hollow fiber membrane module is used, and when the humidity of the supply air A is or will be decreased to be lower than the target humidity, by referring to the airflow, and if the airflow amount is large, the control unit 4 produces a control signal so as to utilize two hollow fiber membrane modules and send the produced signal to the switching means. This makes the flow rates of the supply air A and the exhaust air Ac within the hollow fiber membrane modules adequate, and accelerates the moisture exchange between them to increase the humidity of the supply air A. On the other hand, considering the situation is considered that two hollow fiber membrane modules are used and the humidity of the supply air is or will be decreased to be lower than the target humidity. In this case, by referring the airflow amount, if the airflow amount is small, the control unit 4 produces a control signal so as to utilize one hollow fiber membrane module and send the produced signal to the switching means. This makes the flow rates of the supply air A and the exhaust air Ae within the hollow fiber membrane modules adequate, and accelerates the moisture exchange between them to increase the humidity of the supply air A. In the case where the humidity of the supply air is or will be increased to be higher than the target humidity, the converse control is performed.

(4) Control of Negative Pressure:

The control unit 4 controls a negative pressure of the fuel cell 1 during the course of normal operation (normal control) based on the map showing the relation between the airflow amount and the target opening depicted on FIG. 3.

First, the map of FIG. 3 will be described. This airflow amount/target opening map is a map for setting a negative pressure at small in a region where the flow amount of the supply air A (hereinafter referred to as "airflow") is small, setting a negative pressure at middle in a region where the airflow is middle, and setting a negative pressure at large in a region where the airflow is large.

Amongst three narrow lines depicted on the map, the lower line is a reference line for obtaining the pressure of 90 kPa (absolute pressure, and so forth) from the airflow and the opening of the valve. Similarly, the central line is a referential line for obtaining the pressure of 80 kPa, and the upper line is a referential line for obtaining the pressure of 70 kPa. It is noted that standard atmospheric pressure is 100.1 kPa. Consequently, the fuel cell 1 according to this embodiment is operated at 90 kPa in a region where the airflow is small, at 80 kPa in a region where the airflow is middle, and at 70 kPa in a region where the airflow is large. Specifically, this embodiment has a configuration that as the airflow becomes larger, the negative pressure makes larger by the valve 23 for controlling the negative pressure.

As described above, the reason why as the airflow becomes larger, the negative pressure makes larger is that when the airflow amount become larger, the power generation amount of the fuel cell 1 becomes larger, in which case the amount of the produced water becomes larger and the produced water tends to stays within the fuel cell 1. The residence of the produced water inhibits the power generation of the fuel cell 1. Consequently, as the airflow amount is increased, the negative pressure becomes larger to accelerate the discharge of the produced water. The airflow amount is increased corresponding to the power generation amount as described above.

The negative pressure control during the course of normal operation (normal control) is carried out by the control unit 4 in such a manner that map search is carried out utilizing the airflow amount as an address to decide the opening the valve 23 for controlling the negative pressure. The control unit 4 produces a control signal in order to obtain the opening of the valve 23 corresponding to the target opening, and actuates the stepping motor of the valve 23. This executes the target opening of the valve and gives a prescribed negative pressure corresponding to the airflow.

Figure 4:
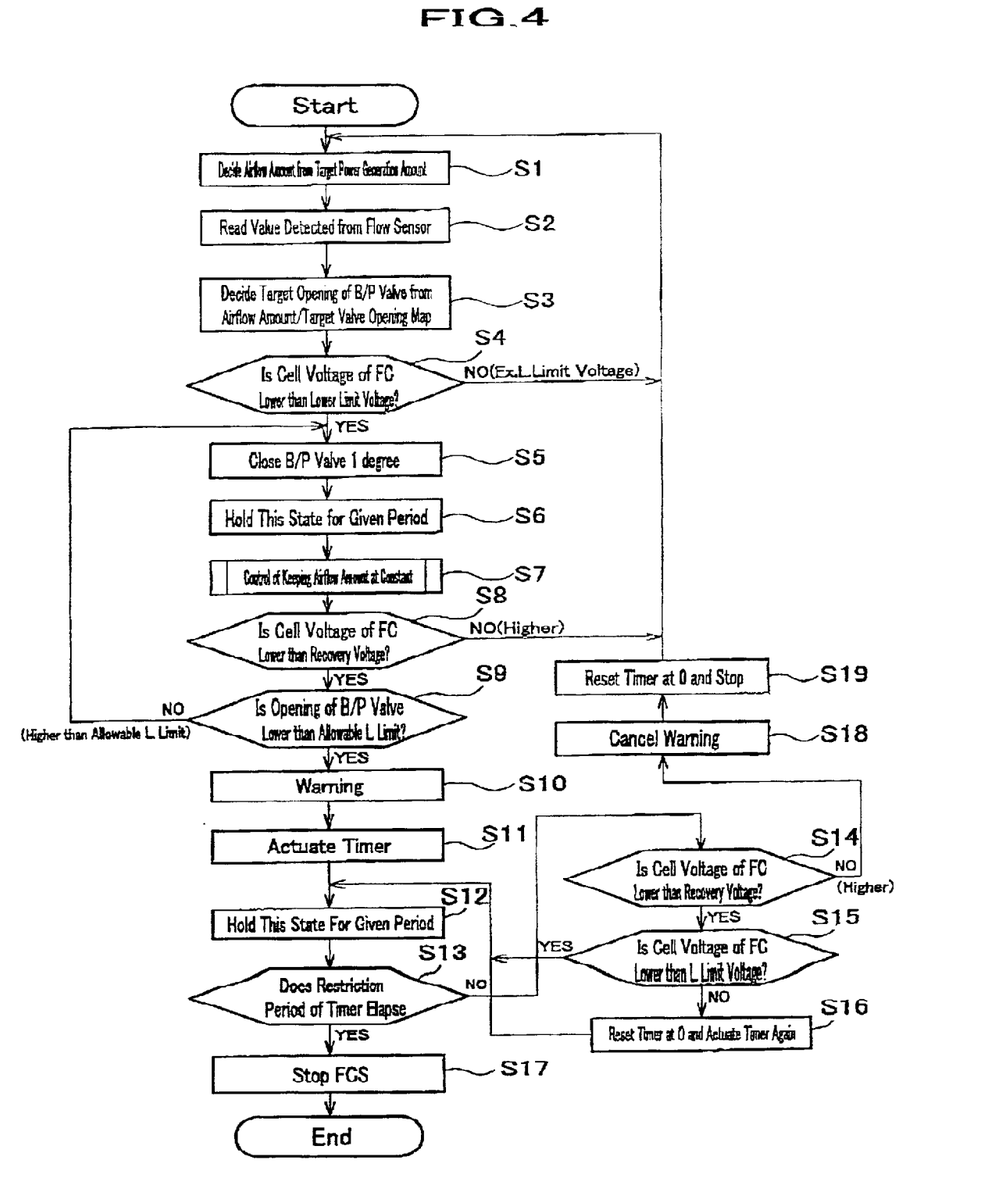
FIG. 4 is a flowchart of the negative pressure control in carrying out the negative pressure control according to one embodiment of the present invention.

Next, by referring to the negative pressure flowchart of FIG. 4, the negative pressure control will be specifically described (also referring to FIGS. 1 to 3 as occasion demands). In the negative pressure control, when the cell voltage of the fuel cell is decreased, the negative pressure is controlled to be large to accelerate the discharge of the produced water to recover the cell voltage. The detection of the cell voltage is carried out utilizing a cell voltage sensor (not shown).

(1) Normal Control:

During the course of the normal control, the control unit 4 decides the airflow amount from the target power generation amount of the fuel cell 1 (S1). Specifically, the control unit 4 decides the revolution number of (the motor) of the suction pump 24, and the suction pump is operated at the decided revolution number. The control unit 4 reads the value detected from the flow amount sensor Q (S2), and decides the target opening of the valve 23 to be operated from the airflow amount/target opening map (S3). The control unit 4 judges whether or not the cell voltage of the fuel cell 1 is lower than the lower limit of the voltage (S4). If it exceeds the lower limit of the voltage, in which case there is no residence of the produced water within the fuel cell 1, the control unit 4 is returned to Step S1 to carry out the normal control. As described above, the fuel cell 1 is operated in such a manner that when the airflow amount is increased, the negative pressure becomes large.

(2) Control for Increasing Negative Pressure:

On the other hand, if the cell voltage is lower than the lower limit of the voltage, the control unit 4 judges that there is residence of the produce water within the fuel cell 1, the valve 23 for controlling the negative pressure closes 1 deg (S5), and maintains this situation for a prescribed period (S6). In this case, the prescribed period means a short period of time not longer than several seconds. In the case where the airflow amount is decreased by closing the valve 23 one degree, the control unit 4 increases the revolution number of the motor of the suction pump 24 to make the airflow amount constant (S7). These operations make the negative pressure of the fuel cell 1 large, accelerating the discharge of the produced water. For example, if the throttle pedal is stepped in during this actuation whereby the target power generation amount is increased, the control of increasing the airflow amount is executed in Step 37. Conversely, if the target power generation is decreased, for example, by releasing the throttle pedal, no control of increasing the airflow amount is executed in Step S7 in order to easily discharge the produced water. The situation where the produced water is apt to stay in the fuel cell 1 is that the power generation amount of the fuel cell 1 is large as described above (in this case, the airflow amount is also large).

The control unit 4 is then judges whether or not the cell voltage V of the fuel cell 1 is lower than the recovery voltage (S8). If the cell voltage V is not lower than the recovery voltage, which can be judged to discharge the produced water staying within the fuel cell 1 to solve the problem, the control unit 1 is returned to Step S1 to carry out the normal control. The term "recovery" used herein means that the situation of the control is switched from the control of increasing the negative pressure to the normal control.

In this embodiment, since the negative pressure control is mainly carried out by the valve 23 for controlling the negative pressure, the motive power for the suction pump 24 for the purpose of discharging the produced water can be significantly reduced. In this respect, the control of the present invention is different from the control of increasing the negative pressure only by a vacuum pump (suction pump). Also, the present invention is different from the discharge of the produced water by compressively transferring the supply air by the air compressor as in the prior art. As described previously, the acceleration of the discharge of produced water in the case where the airflow amount is constant is due to the fact that sucking force through the negative pressure becomes stronger, the fact that the vaporization of the produced water is accelerated by decreasing the pressure, and the fact that the increasing of the flow rate of the supply air accelerates the vaporization of the produced water.

Returning to the explanation of the flowchart of the negative pressure control, if the cell voltage is lower than the recovery voltage in Step S8, the control unit 4 judges whether or not the opening of the valve 23 for controlling the negative pressure is the allowable lower limit of the opening (S9). If it is not lower than the allowable lower limit of the opening, the control unit 4 is returned to step S5 and closes the valve 23 for controlling the negative pressure one degree each to continue the control of gradually increasing the negative pressure. This makes the negative pressure large to accelerate the discharge of the produced water.

(3) Evacuation Control:

If the opening of the valve 23 for controlling the negative pressure reaches the allowable lower limit in Step 9, the following evacuation control is carried out. The allowable lower limit of the opening of the valve 23 for controlling the negative pressure is not in the situation where the valve is totally closed, but in the situation where the supply air A flows with restricting the valve 23 for controlling the negative pressure. The allowable lower limit of the opening of the valve is decided taking into the consideration of the differential pressure between the cathode side and the anode side, etc. The airflow amount in this case is still the flow amount of the supply air A decided in Step S7. In this evacuation control, when the accelerator pedal is stepped in, the power over the power generation amount of the fuel cell is taken out from an energy buffer such as a battery, and is supplied into the motor etc.

In the evacuation control, when the opening of the valve 23 for controlling the negative pressure becomes the allowable lower limit of the opening, warming is indicated to the driver, a timer is actuated, and this state is kept for a prescribed period of time (S10, S11, and S12). Then, the control unit 4 judges where the restriction time of the timer is elapsed (S13). If the restriction time does not elapse, the control unit 4 judges whether or not the cell voltage is not greater than the recovery voltage (S14). If the cell voltage exceeds the recovery voltage, the produced water staying within the fuel cell is judged to be discharged, which means the problem has been solved, and, thus, the warning is cancelled, and the timer is returned and stopped (S18, and S19). Thereafter, the step is shifted to Step S1 to carry out the normal control. The prescribed period for keeping the state is a short period, e.g., not more than several seconds. The restriction period of the timer is a given period longer than the prescribed period.

On the other hand, if the cell voltage is lower than the recovery voltage in Step S14, the control unit 4 judges whether or not the cell voltage is not greater than the allowable lower limit voltage (S15). If the cell voltage is not greater than the allowable lower limit voltage, the control unit 4 is shifted to Step 12, at which the control unit 4 judges whether or not the restriction period elapses (S13). If the restriction period elapses, the control unit 4 judges there is no possibility of recovery, stops the fuel cell system FCS (S17) and the control is ended (the vehicle is stopped). If the restriction period does not elapse, the control unit 4 is shifted to step S14, and continues the evacuation control.

If the cell voltage exceeds the lower limit voltage in step S15, it can be judged that there is no problem for the continuation of operating the fuel cell system FCS although the cell voltage does not reach the recovery voltage. Accordingly, in this case, the control unit 4 reset the timer at 0 and actuates the timer again (S12) to further continue the evacuation control.

Difference (hysteresis) between the lower limit voltage and the recovery voltage is set in order to stabilize the control.

Subsequently, the flowchart of the negative pressure control of FIG. 4 will now be described in greater detail by referring to the control time chart of FIG. 5.

Figure 5:
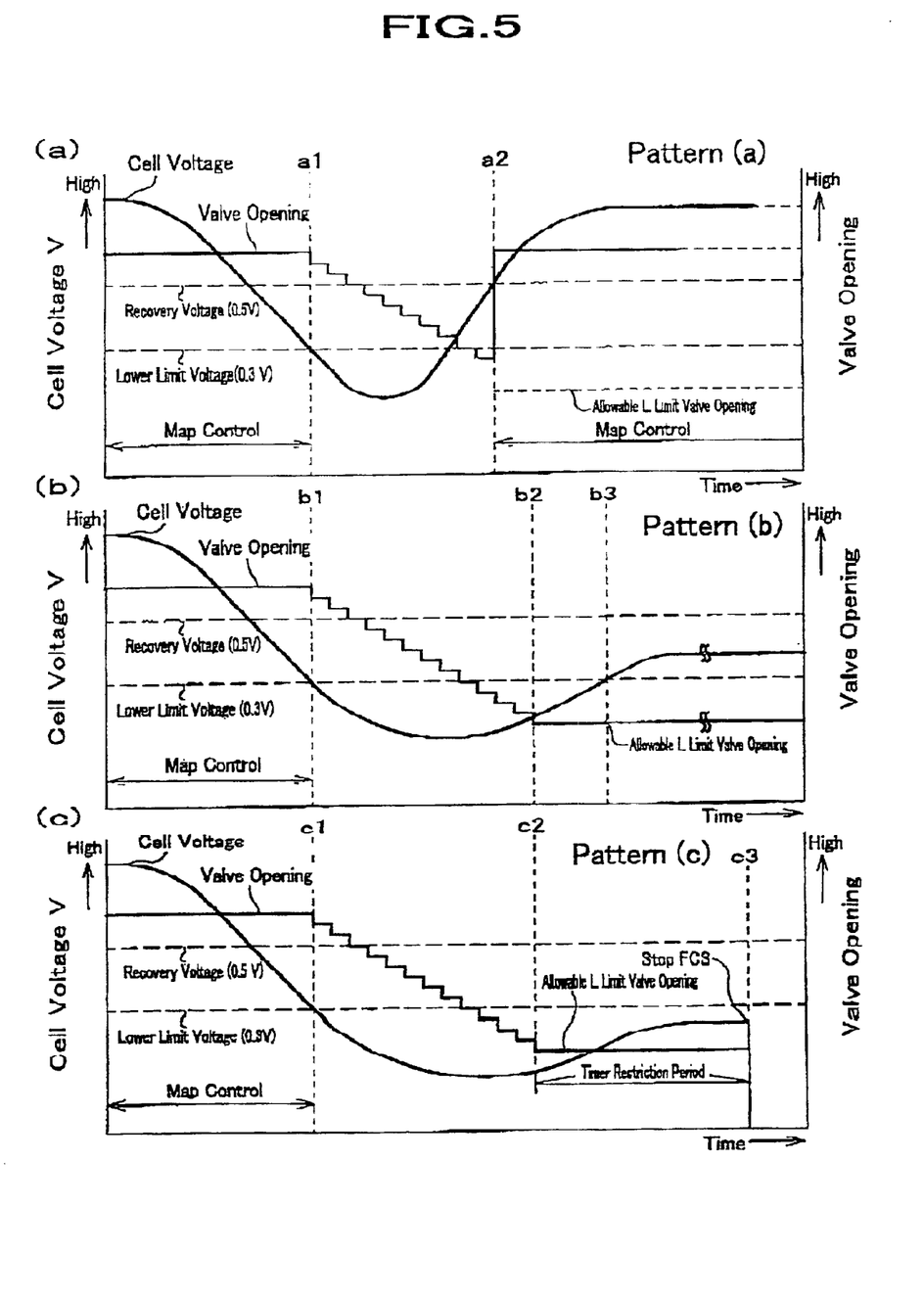
FIG. 5 shows a time chart in executing the negative pressure control according to the flowchart of FIG. 4, where

FIG. 5 shows a time chart in executing the negative pressure control according to the flowchart of FIG. 4, wherein the thick line 5 shows the cell voltage v, and the thin line shows the opening of the valve 23 for controlling the negative pressure.

(Pattern a)

Pattern (a) that the cell voltage, which becomes lower than the lower limit voltage is recovered to be greater than the recovery voltage is described by referring to FIG. 5A.

In the course of the normal control, the produced water stays within the fuel cell, and the cell voltage V is decreased. When the cell voltage is lower than the lower limit voltage (a1), the valve 23 for controlling the negative pressure is gradually closed to carry out the control of increasing the negative pressure that the negative pressure is gradually increased (S5–S9 in FIG. 4). Meanwhile, the produced water is discharged by the negative pressure, which becomes larger, whereby the cell voltage V is gradually recovered. If the cell voltage V is recovered to the recovery voltage (a2), the control state is returned to the normal control (S8 in FIG. 4). When the control state is returned to the normal control, the valve 23 for controlling the negative pressure is controlled based on the map shown in FIG. 3. In pattern (a), the opening of the valve 23 does not reach the allowable lower limit of opening.

(Pattern b)

Pattern (b) that the cell voltage, which becomes lower than the lower limit voltage is recovered to be greater than the lower limit voltage and lower than the recovery voltage is described by referring to FIG. 5B.

In the course of the normal control, the produced water stays within the fuel cell, and the cell voltage V is decreased. When the cell voltage is lower than the lower limit voltage (b1) the valve 23 for controlling the negative pressure is gradually closed to carry out the control of increasing the negative pressure that the negative pressure is gradually increased (S5–S9 in FIG. 4). In pattern (b), the valve 23 for controlling the negative pressure is closed to the allowable lower limit of the opening (b2). This starts the recovery of the cell voltage V. However, since the cell voltage V is not recovered to the recovery voltage, the evacuation control is carried out in this case (S10—in FIG. 4). In the evacuation control, while keeping the valve 23 for controlling the negative pressure at the allowable lower limit of opening, the control awaits the recovery of the cell voltage V. This recovers the cell voltage V exceeding the lower limit voltage (b3). However, since the cell voltage V is not recovered to the recovery voltage, in this case, the operation is continued while resetting the timer to 0 (S16, etc. in FIG. 4).

Although not shown in FIG. 5B, if the cell voltage V is recovered to the recovery voltage, which can be judged to completely discharge the produced water, the control is returned to the normal control (S14, S18, and S19 in FIG. 4).

(Pattern c)

A pattern (c) that the cell voltage V, which becomes lower than the lower limit voltage is not recovered to be the lower limit voltage will be described by referring to FIG. 5C.

In the course of the normal control, the produced water stays within the fuel cell, and the cell voltage V is decreased. When the cell voltage is lower than the lower limit voltage (c1), the valve 23 for controlling the negative pressure is gradually closed to carry out the control of increasing the negative pressure that the negative pressure is gradually increased (S5–S9 in FIG. 4). In pattern (c), the valve 23 for controlling the negative pressure is closed to the allowable lower limit of the opening (c2). However, since the cell voltage V is not recovered to the recovery voltage, the evacuation control is carried out in this case (S10—in FIG. 4). In the evacuation control, while keeping the valve 23 for controlling the negative pressure at the allowable lower limit of opening, the control awaits the recovery of the cell voltage V. However, in pattern (c), the cell voltage V is not recovered to exceed the lower limit voltage, the restriction period by the timer elapses (c3), judging to be abnormal to stop the fuel cell system FCS (S13 and S17 in FIG. 4).

As described above, when the cell voltage is decreased, the gas-supplying apparatus for a fuel cell according to the present invention recovers the cell voltage by making the negative pressure large to accelerate the discharge of the produced water. In this case, as different from the control of increasing the negative pressure only by a suction pump, the apparatus according to the present invention increases the negative pressure mainly by the valve for controlling the negative pressure, making it possible to decrease the motive power (power consumption). Since the pressure loss is smaller than that in the case of compressively transferring the supply air as in the prior art, the apparatus of the present invention can save the motive power (power consumption). As described previously, the produced water can easily be discharged.

On the other hand, in the normal control, the negative pressure is increased in a region of a large power generation amount where a large amount of water is produced to accelerate the discharge of the produced water. This can smoothly operate the fuel cell system. Since the negative pressure is increased by the valve for controlling the negative pressure in this case, an adequate airflow amount corresponding to the power generation amount at this time can be secured to operate the fuel cell system without wasteful motive power of the suction pump.

While embodiments of the present invention have been described, various modifications of the present invention can be made.

For example, the fuel cell which can be used in the present invention should not be restricted to a proton exchange membrane fuel cell and any other type fuel cell can be applicable to the apparatus of the present invention.

Also, while the gas-supplying apparatus the present invention has a configuration that hydrogen is supplied from the hydrogen gas cylinder into the fuel cell, a liquid raw fuel material may be reformed in a reformer, which is supplied into the fuel cell. Regardless of the circulation of the exhaust hydrogen, the present invention may be applied at the side of the hydrogen gas-supplying apparatus. The humidifier may be one which utilize a two fluid nozzle or supersonic waves. The water-permeable membrane is not restricted to the hollow fiber membrane. With regard to the suction pump, in addition to a super turbo charger type or a turbo charger type, which revolves a turbine, a reciprocating type may also be utilized.

Also, in the flowchart of the negative pressure control shown in FIG. 4, it is possible to carry out the control in combination with control, which increases an airflow amount when the cell voltage is not recovered even if the valve for controlling the negative pressure is closed to the allowable lower limit opening. It is needless to say that these modified configurations are within the scope of the present invention.

What is claimed is:

1. A gas-supplying apparatus for a fuel cell, which generates electrical power due to an electrochemical reaction between oxygen and hydrogen, during which water is produced, and which has a cathode side gas passage and an anode side gas passage within the fuel cell, said apparatus comprising:

a suction pump provided downstream of the cathode side gas passage for drawing and compressing a used supply gas from the fuel cell during operation thereof; and a pressure control valve which controls the pressure of the supply gas within the fuel cell, provided upstream of said cathode side gas passage, wherein the suction pump controls the pressure of the supply gas to be a negative pressure during operation of the fuel cell, whereby water produced during the course of said electrochemical reaction is discharged.

2. The gas-supplying apparatus for a fuel cell according to claim 1, wherein said pressure control valve controls the pressure of the supply gas depending upon the power generation amount generated in said fuel cell.

3. The gas-supplying apparatus for a fuel cell according to claim 2, wherein said pressure control valve decreases the pressure of the supply gas when the power generation amount is increased.

4. The gas-supplying apparatus for a fuel cell according to claim 1, wherein said suction pump controls the flow amount of the supply gas depending upon the power generation amount generated in said fuel cell.

5. The gas-supplying apparatus for a fuel cell according to claim 4, wherein said suction pump increases the flow amount of the supply gas when the power generation amount is increased.

6. The gas-supplying apparatus for a fuel cell according to claim 1, wherein said pressure control valve controls the pressure of the supply gas depending upon the cell voltage of the fuel cell.

7. The gas-supplying apparatus for a fuel cell according to claim 6, wherein said pressure control valve decreases the pressure of the supply gas when the cell voltage is lower than a given level.

8. The gas-supplying apparatus for a fuel cell according to claim 7, wherein when the pressure of the supply gas is decreased by the pressure control valve, the suction pump controls the amount of the supply gas to be increased.

9. The gas-supplying apparatus for a fuel cell according to claim 7, wherein the suction pump increases the amount of the supply gas when the cell voltage of the fuel cell is not recovered.

10. A process for supplying gas to a fuel cell, which generates electric power due to an electrochemical reaction between oxygen and hydrogen, during which water is produced, and which has a cathode side gas passage and an anode side gas passage within the fuel cell, said process comprising:

sucking and compressing a used supply gas from a downstream side of the fuel cell during the course of said electrochemical reaction, and controlling the pressure of the supply gas within the fuel cell to be a negative pressure during the course of said electrochemical reaction to thereby discharge water produced during the course of said electrochemical reaction.

11. The process according to claim 10, wherein the sucking of the supply gas is carried out depending upon the power generation amount of the fuel cell.

12. The process according to claim 10, wherein the pressure control of the supply gas is carried out depending upon the cell voltage of the fuel cell.

13. The gas-supplying apparatus for a fuel cell according to claim 1, wherein said suction pump and said fuel cell are provided separately.

14. The gas-supplying apparatus for a fuel cell according to claim 1, wherein an inlet of said suction pump is connected to an outlet of said cathode side passage.

* * * * *